US008638323B2

(12) United States Patent
Lee et al.

(10) Patent No.: US 8,638,323 B2
(45) Date of Patent: Jan. 28, 2014

(54) SYSTEM AND METHOD FOR CORRECTING GAMMA

(75) Inventors: Joo Hong Lee, Seoul (KR); Hong Sung Song, Gumi-si (KR); Oh Hyun Lee, Gimeheon-si (KR); Woong Ki Min, Daegu-si (KR)

(73) Assignee: LG Display Co., Ltd., Seoul (KR)

( * ) Notice: Subject to any disclaimer, the term of this patent is extended or adjusted under 35 U.S.C. 154(b) by 565 days.

(21) Appl. No.: 12/318,520

(22) Filed: Dec. 30, 2008

(65) Prior Publication Data

US 2010/0073339 A1 Mar. 25, 2010

(30) Foreign Application Priority Data

Sep. 24, 2008 (KR) ........................ 10-2008-0093802

(51) Int. Cl.

| | |
|---|---|
| ***G06F 3/038*** | (2013.01) |
| ***G09G 5/00*** | (2006.01) |
| ***G09G 5/10*** | (2006.01) |
| ***G09G 3/36*** | (2006.01) |

(52) U.S. Cl.
USPC ........... 345/207; 345/204; 345/208; 345/690; 345/89

(58) Field of Classification Search
USPC .................................... 345/204, 207, 208, 89
See application file for complete search history.

(56) References Cited

U.S. PATENT DOCUMENTS

| | | | | |
|---|---|---|---|---|
| 6,567,159 | B1 * | 5/2003 | Corech | 356/71 |
| 6,704,008 | B2 | 3/2004 | Naito et al. | |
| 2003/0231193 | A1 | 12/2003 | Shimazaki et al. | |
| 2004/0036708 | A1 | 2/2004 | Evanicky et al. | |
| 2005/0196064 | A1 * | 9/2005 | Sugimoto | 382/266 |
| 2005/0201615 | A1 * | 9/2005 | Hsu et al. | 382/167 |

FOREIGN PATENT DOCUMENTS

| | | | |
|---|---|---|---|
| JP | 07-064522 | | 3/1995 |
| JP | 07064522 | A * | 3/1995 |
| JP | 08-298630 | | 11/1996 |
| JP | 08298630 | A * | 11/1996 |

* cited by examiner

*Primary Examiner* — Ilana Spar
(74) *Attorney, Agent, or Firm* — McKenna Long & Aldridge LLP

(57) ABSTRACT

Disclosed is a system and method for correcting a gamma for shortening a gamma correction time period and improving gamma correction efficiency and reliability thereof, and simplifying a gamma correction device for reducing a production cost of image display devices.

7 Claims, 6 Drawing Sheets

SYSTEM AND METHOD FOR CORRECTING GAMMA

This application claims the benefit of the Korean Patent Application No. P2008-093802, filed on Sep. 24, 2008, which is hereby incorporated by reference for all purposes as if fully set forth herein.

BACKGROUND OF THE INVENTION

1. Field of the Invention

The present invention relates to gamma correction systems, and more particularly, to a system and method for correcting a gamma for shortening a gamma correction time period and improving gamma correction efficiency and reliability thereof, and simplifying a gamma correction device for reducing a production cost of image display devices.

2. Discussion of the Related Art

The use of flat display devices is increasing as a liquid crystal display device, field emission display device, plasma display panel, light emitting display device, and so on. Since the flat display devices have good resolution, color display and image quality, the flat display devices may be applied to notebook computers, desktop computers, and mobile terminals.

Of the flat display devices, the liquid crystal display device and the light emitting display device divide gamma voltages from gamma reference voltage generating units to generate a plurality of gray scale voltages, select the gray scale voltages as image signals, and provide the image signals to the display panels, respectively.

However, the display panels, for example, a liquid crystal display panel of the liquid crystal display device has variation in the gamma voltage with distortion of the gamma voltages caused by a size thereof or a resistance characteristic of switching devices therein.

In the related art, in order to correct the distortion of the gamma voltages, the gamma voltages are corrected for each display panel separately by using a multi-break point correction method in which an analog or digital circuit is used, R-String correction method or a gamma programming correction method. Particularly, the weakened limitation on circuit size increase owing to the recent improvement in device packing density of integrated circuit and high correction accuracy permits to use the gamma programming correction method mostly, in which a gamma-IC is programmed.

However, referring to FIG. 1, the related art gamma programming correction method detects high gray scales, low gray scales, and white and black brightness for each point of each panel, compares and analyze variation of the brightness and so on using a plurality of optical instruments, and makes programming of a gamma IC circuit according to a result of the comparison and analysis. The method has a disadvantage in that a tact time is long because initial correction of the plurality of optical instruments is required, and incidence of programming error is high due to the plurality of the measuring points. Along with this, the gamma correction device is complicated and has high costs, which makes a production cost of the image display panel high.

SUMMARY OF THE INVENTION

Accordingly, the present invention is directed to system and method for correcting a gamma.

An advantage of the present invention is to provide a system and method for correcting a gamma for shortening a gamma correction time period and improving gamma correction efficiency and reliability thereof, and simplifying a gamma correction device for reducing a production cost of image display devices.

Additional features and advantages of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a gamma correction system includes a brightness detection unit for detecting pieces of brightness information from images displayed with at least two gray scale levels on a display panel of an image display device alternately and repetitively in response to a gamma correction control signal set by a user, and a gamma correction device for averaging pieces of brightness information detected alternately and repetitively in response to the gamma correction control signal respectively, and selecting gamma correction information according to a ratio of the averages for correcting a gamma voltage of the image display device.

The gamma correction control signal includes a plurality of pieces of offset information for controlling the image display device, including the brightness detection unit and the gamma correction unit, wherein the offset information includes gray scale information on the images of at least two gray scale levels displayed alternately and repetitively on the display panel of the image display device, a number of detection times of the brightness information by the brightness detection unit, and the gamma correction control signal of the gamma correction device.

The gamma correction unit includes a memory unit for storing a plurality of pieces of gamma correction information and forwarding the gamma correction information relevant to a selection control signal upon reception of the selection control signal, a data processing unit for receiving the brightness information on images for each of the gray scale levels from the brightness detection unit in succession and calculating averages of the pieces of brightness information for each of the gray scale levels and ratios thereof, a gamma correction control unit for generating the selection control signal relevant to the ratio information and forwarding the selection control signal to the memory unit, generating and forwarding a gamma correction enable signal in response to the selection control signal, and a gamma correction unit for receiving the gamma correction information from the memory unit upon reception of the gamma correction enable signal from the gamma correction control unit, and correcting the gamma voltage of the image display device by using the gamma correction information.

In another aspect of the present invention, a method for correcting a gamma includes the steps of detecting pieces of brightness information from images displayed with at least two gray scale levels on a display panel of an image display device alternately and repetitively in response to a gamma correction control signal set by a user, and averaging pieces of brightness information detected alternately and repetitively in response to the gamma correction control signal respectively, and selecting gamma correction information according to a ratio of the averages for correcting a gamma voltage of the image display device.

The step of detecting pieces of brightness information includes the step of detecting the brightness information on the images displayed with at least two gray scale levels at least one time alternately and repetitively by using a brightness detection unit having single photo-sensor.

The step of correcting a gamma voltage includes the steps of storing a plurality of gamma correction signals, and forwarding the gamma correction signal relevant to a selection control signal upon reception of the selection control signal, receiving pieces of brightness information on images for each of gray scale levels in succession and calculating averages of the pieces of brightness information on images for each of gray scale levels and ratio information of the averages, generating the selection control signal relevant to the ratio information, supplying the selection information to a memory unit, generating a gamma correction enable signal when the selection control signal is received and forwarding the gamma correction enable signal, receiving the gamma correction information from the memory unit in response to the gamma correction enable signal, and correcting the gamma voltage of the image display device by using the gamma correction information received thus, and detecting the brightness information of the image display device having a gamma thereof corrected thus again, for re-examining defect of the display panel at least one or more than one time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
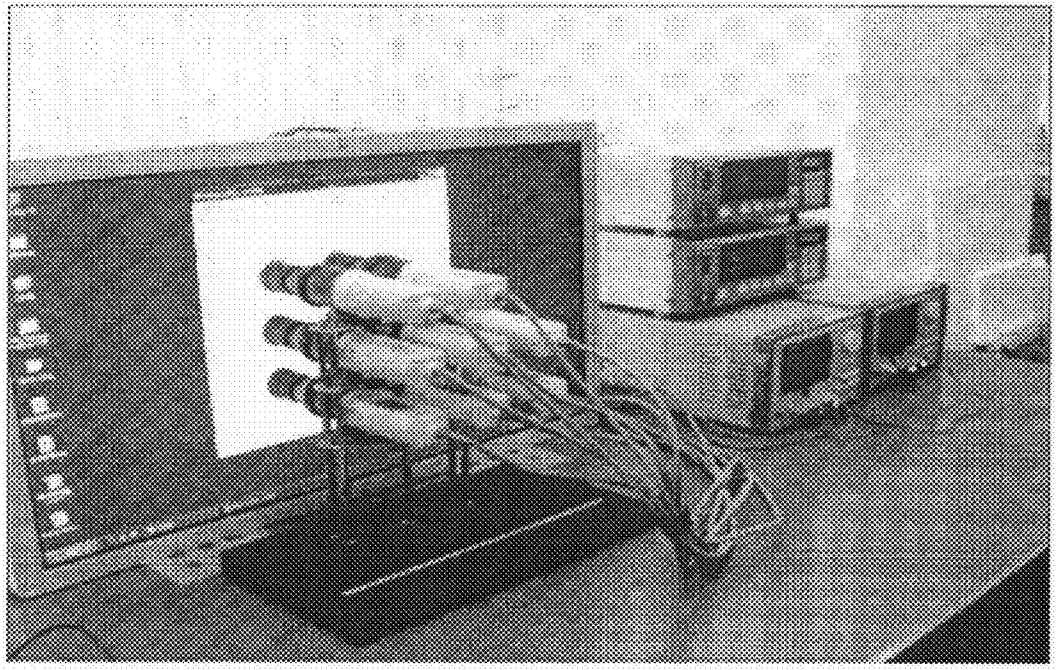
FIG. 1 Related Art
FIG. 1 illustrates a photograph of a related art gamma correction device.
Figure 2:
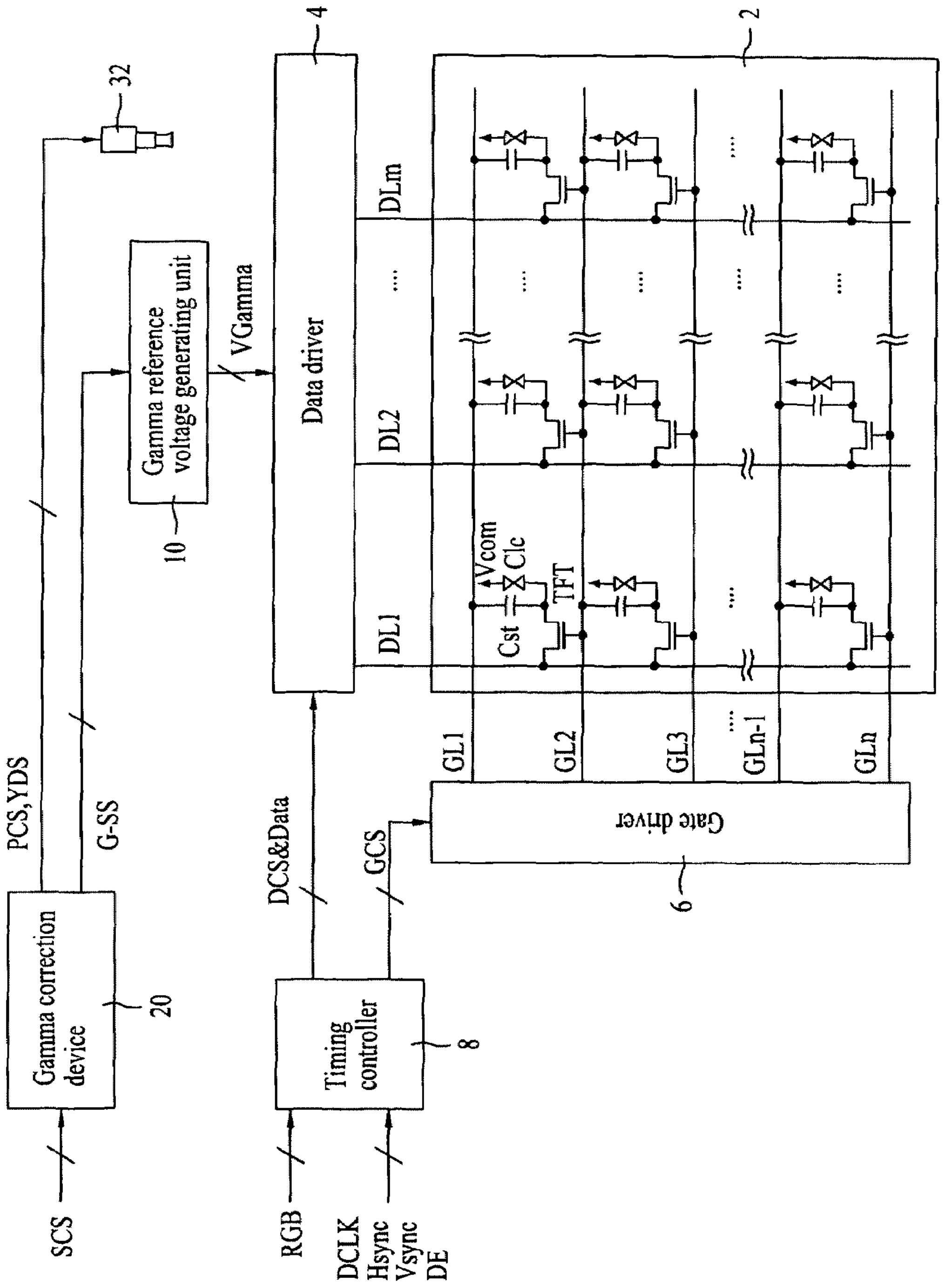
FIG. 2 illustrates a block diagram of a gamma correction system in accordance with an embodiment of the present invention.
Figure 3:
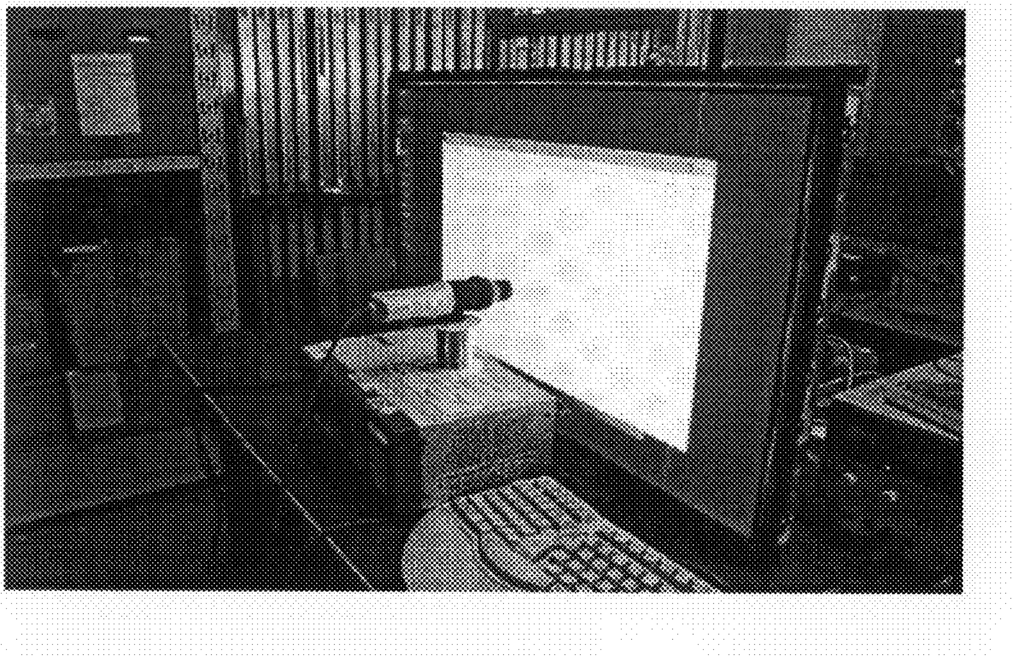
FIG. 3 illustrates a photograph of the gamma correction device in FIG. 2.

FIG. 2 illustrates a block diagram of a gamma correction system in accordance with an embodiment of the present invention, and FIG. 3 illustrates a photograph of the gamma correction device in FIG. 2.

Referring to FIG. 2, the gamma correction system includes a brightness detection unit 32 for repetitive and alternative detection of brightness information YDS from each of images displayed with at least two gray scale levels on a display panel 2 of an image display device in response to a gamma control signal SCS set by a user, and a gamma correction device 20 for averaging the brightness information YDS repetitively and alternatively detected in response to the gamma control signal SCS, selecting gamma correction information according to ratios of the averages, and correcting a gamma voltage of the image display device.

Referring to FIG. 3, the brightness detection unit 32 has single optical instrument, such as photo-sensors, and so on, for repetitive detection of brightness, i.e., brightness information, of an image displayed on the display panel 2 in response to a detection control signal PCS from the gamma correction device 30. Particularly, the brightness detection unit 32 is singular. This is because a gamma variation characteristic of a displayed image is not local, but substantially uniform throughout an entire region of the image in most of the cases. That is, if the gamma voltages are elevated, the gamma voltages are elevated throughout the entire region of the display panel 2 in similar levels, and opposite to this, if the gamma voltages are dropped, the gamma voltages are dropped throughout the entire region of the display panel 2 in similar levels. Since the brightness detection unit 32 detects the brightness information YDS from each of images displayed with at least two gray scale levels on the display panel 2 repetitively and alternatively, the brightness detection unit 32 can improve accuracy and reliability of the brightness information YDS even if the brightness information YDS is detected only from one point.

The gamma correction device 200 receives the gamma correction signal SCS from a user, and corrects the gamma voltage, for an example, a gamma reference voltage of the image display device, in response to the gamma correction signal SCS received thus.

In detail, the gamma correction device 20 controls the brightness detection unit 32 in response to the gamma correction signal SCS for receiving the brightness information YDS on each of gray scale levels from the brightness detection unit 32 alternately and repetitively, and stores the brightness information YDS received thus therein in succession. Then, the gamma correction device 20 averages the brightness information on each of gray scale levels, and calculates a brightness average ratio of a brightness average of a gray scale level to the other brightness averages of a gray scale levels. The gamma correction device 20 retrieves gamma correction information relevant to the brightness average ratio calculated thus from a memory thereof, and corrects the gamma voltage, for an example, the gamma reference voltages, of the image display device by using the gamma correction information retrieved thus. The gamma correction device 20 will be described in detail, with reference to the attached drawings, later.

The gamma correction signal SCS set and applied by the user has a large amount of offset information for controlling the image display device including the brightness detection unit 32 and the gamma correction device 20. In detail, the offset information includes gray scale information on images of the at least two gray scale levels displayed on the display panel 2 of the image display device alternately and repetitively, a number of detection times of the brightness information YDS by the brightness detection unit 32, and the gamma correction signal control signal from the gamma correction device. Accordingly, a number of detection times of the brightness information YDS by the brightness detection unit 32 can be set according to the offset information in advance, when the alternative and repetitive number of detection times can be set one or more than one times for each of the gray scale levels. However, for the sake of convenience of description, only a case will be described hereafter, in which the brightness detection unit 32 detects the brightness information YDS for five times repetitively for each of the gray scale levels.

The image display device displays images of at least two gray scale levels on the display panel 2 according to the gray scale level information on at least two images repetitively. Depending on a user's setting, the images of two gray scale levels may be an image of 0 gray scale level 0 gray and an image of 127 gray scale level 127 gray from images of 8 bit 256 gray scale levels. Or, the images of two gray scale levels may be an image of 0 gray scale level 0 gray and an image of 511 gray scale level 511 gray from images of 10 bit 1028 gray scale levels. Thus, though setting of the gray scale and a number of display images for each of the gray scale levels may vary with users, for the sake of convenience of description, only a case will be described, in which an image of 0 gray scale level 0 gray and an image of 127 gray scale level 127 gray from images of 8 bit 256 gray scale levels are displayed, alternately and repetitively.

Figure 4:
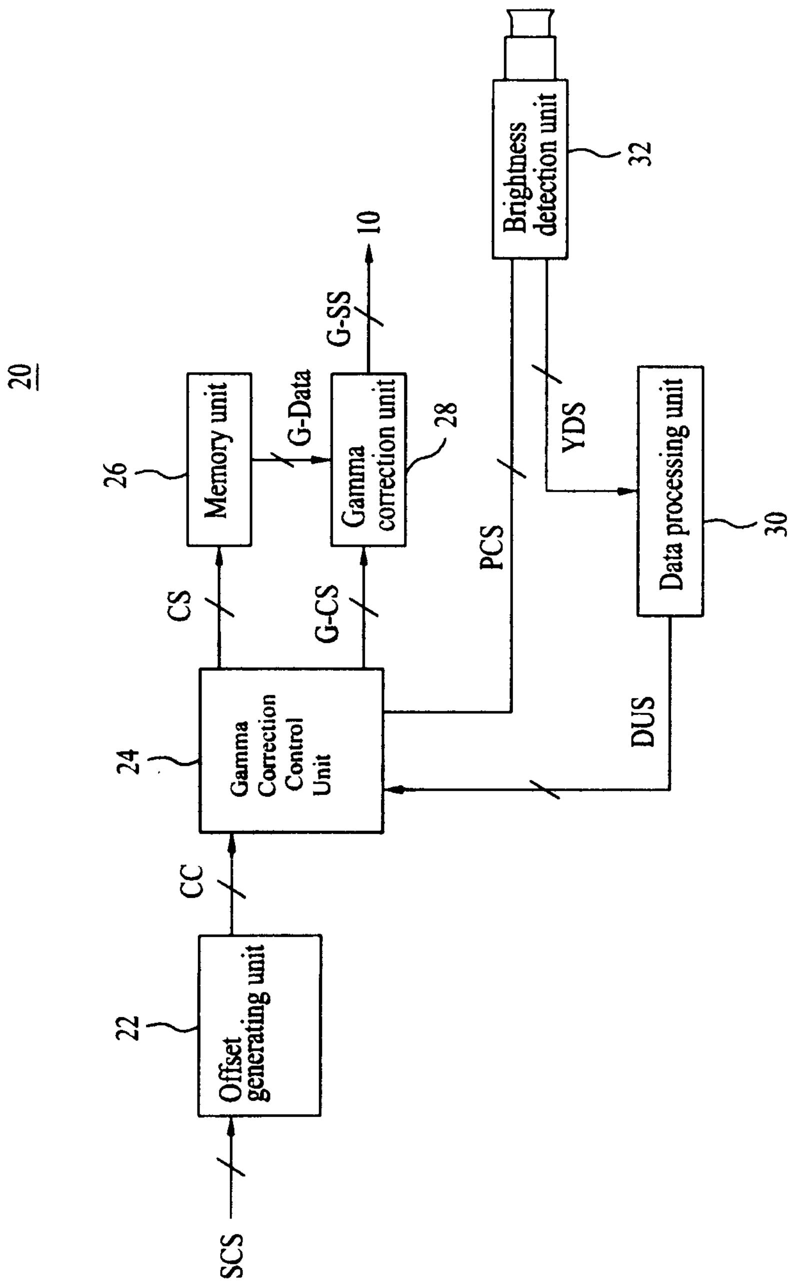
FIG. 4 illustrates a block diagram showing details of the gamma correction device and the brightness detection unit in FIGS. 2 and 3.

FIG. 4 illustrates a block diagram showing details of the gamma correction device and the brightness detection unit in FIGS. 2 and 3.

Referring to FIG. 4, the gamma correction device 20 includes an offset generating unit 22 for making temporal setting of driving offset for the gamma correction device according to offset information included to the gamma correction signal SCS, a memory unit 26 for storing a plurality of pieces of gamma correction information G-data and forwarding the gamma correction information in response to a selection control signal CS upon reception of the selection control signal CS, a data processing unit 30 for receiving the brightness information YDS on images for each of the gray scale levels from the brightness detection unit 32 in succession and calculating averages of the pieces of brightness information YDS for each of the gray scale levels and ratios DUS thereof, a gamma correction control unit 24 for generating the selection control signal CS for the ratio information DUS and forwarding the selection control signal CS to the memory unit 26, generating and forwarding a gamma correction enable signal G-CS in response to the selection control signal SC, and a gamma correction unit 28 for receiving the gamma correction information G-Data from the memory unit 26 upon reception of the gamma correction enable signal G-CS from the gamma correction control unit 24, and correcting the gamma voltage of the image display device by using the gamma correction information G-Data.

The offset generating unit 22 may be an interface for receiving the gamma correction signals SCS from the user, arranging the gamma correction signals SCS, and supplying the gamma correction signals SCS to the gamma correction unit 24 in succession. In detail, the offset generating unit 22 makes temporal analysis of the plurality of pieces of offset information included to the gamma correction control signal SCS. Then, the offset setting unit 22 makes temporal driving offset setting for the gamma correction device 20 and supplies control information CC to the gamma correction control unit 24 in succession in view of time. In this instance, the offset generating unit 22 sets a number of detected gray scale bits of the pieces of brightness information YDS and a number of input/output bits of the brightness information YDS, and a plurality of pieces of gamma correction information G-Data may be stored in the memory unit 26 through the offset setting unit 22. If it is made that such a function of the offset setting unit 22 is performed by the gamma correction control unit G-Data, the offset generating unit 22 may not be provided. That is, the offset generating unit 22 may be built-in the gamma correction control unit 24.

The memory unit 26 may be a non-volatile memory having at least one lookup table stored therein for storing a plurality of pieces of gamma correction information G-Data for correcting the gamma voltage, for an example, the reference gamma voltage, of the image display device. Upon reception of the selection control signal CS from the gamma correction control unit 24, the memory unit 26 supplies the gamma correction information G-Data relevant to the selection control signal CS, i.e., coefficients for each of the gray scales relevant to one of gamma voltage characteristics, to the gamma correction unit 28 in succession.

In detail, the plurality of pieces of the gamma correction information G-Data may be coefficients for each of the gray scales for correcting the gamma voltage characteristic detected at the plurality of display panels 2 such that the gamma voltage characteristic becomes identical to an optimum gamma voltage characteristic the user set. In other words, referring to FIG. 5, the gamma voltage characteristics of the display panels 2 are distorted to vary with characteristic variation. If the user sets the gamma voltage characteristic of a 2.2 gamma curve as an optimum gamma voltage level, the coefficients for each of the gray scales are stored in the memory unit 26 for making correction of the characteristics of the gamma voltage levels distorted thus to be the same with the 2.2 gamma voltage characteristic.

The data processing unit 30 receives the brightness information YDS on images for each of gray scale levels from, alternately and repetitively detected at, the brightness detection unit 32 in succession. Then, the data processing unit 30 combines the brightness information YDS on images for each of gray scale levels, and calculates averages of the brightness of images for each of gray scale levels. Then, the data processing unit 30 calculates a ratio of a brightness average of an image of a gray scale level to the other brightness averages of images of gray scale levels. The ratio of averages calculated thus is supplied to the gamma correction control unit 24 as the ratio information.

Figure 5:
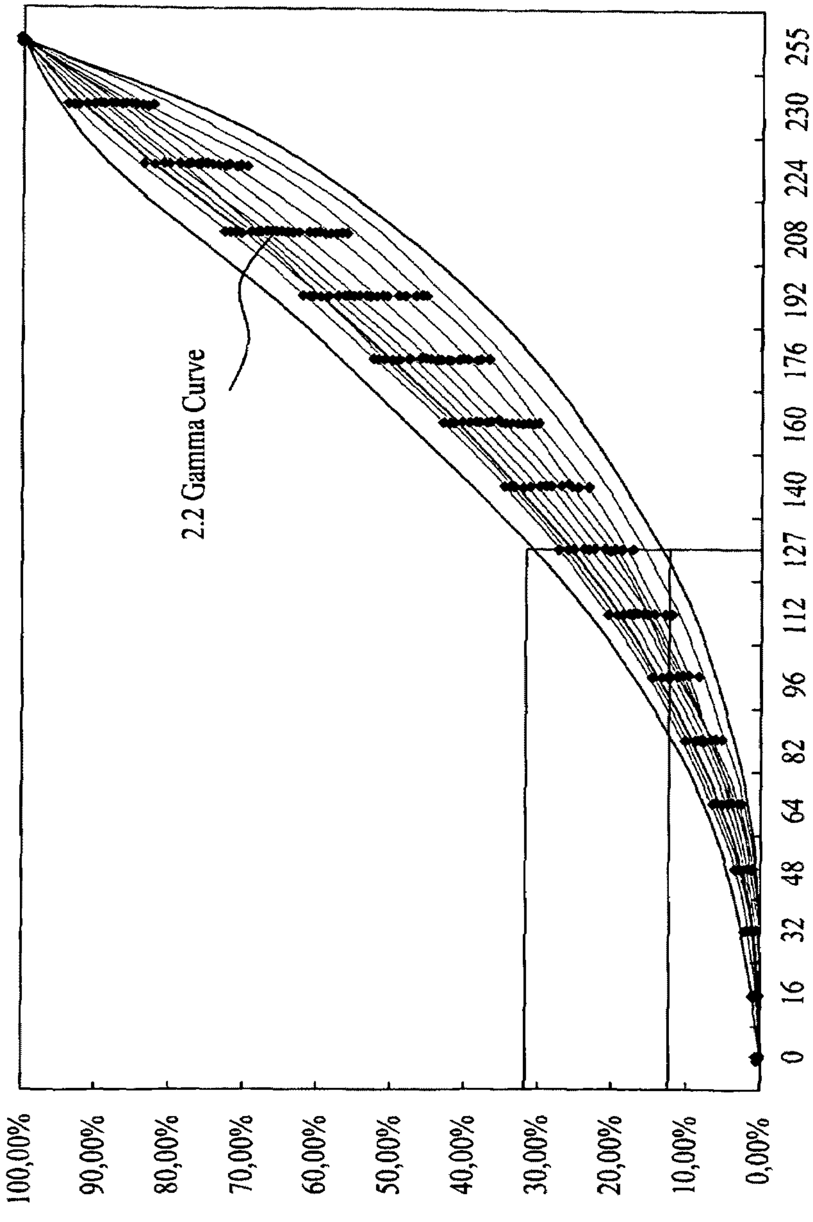
FIG. 5 illustrates a graph showing gamma curves from brightness measured at a plurality of display panels.

In detail, the data processing unit 30 may receive the brightness information YDS on the image of 0 gray scale level and the brightness information YDS on the image of 127 gray scale level from the brightness detection unit 32 for 5 times, alternately. In this case, the data processing unit 30 combines, and calculates an average of, the brightness information YDS on the image of 0 gray scale level supplied thereto for 5 times. The data processing unit 30 combines, and calculates an average of, the brightness information YDS on the image of 127 gray scale level supplied thereto for 5 times. In this instance, in order to correct and minimize detection errors of the brightness information YDS at the brightness detection unit 32, the data processing unit 30 may discard the brightness information YDS detected at first and the brightness information YDS detected at last and combines, and calculates averages of, the pieces of the brightness information YDS detected at second to fourth times. If the average of the brightness on the image of 0 gray scale level and the average of the brightness on the image of 127 gray scale level are calculated thus respectively, the data processing unit 30 calculates a ratio of the average of the brightness of the image of 0 gray scale level to the average of the brightness of the image of 127 gray scale level. The ratio of the average of the brightness calculated thus is supplied to the gamma correction control unit 24 as the ratio information DUS. As shown in FIG. 5, since the ratio of brightness average calculated thus is set to be in a range of about 12.0%~30.0% at the 127 gray scale level, the gamma correction information G-Data stored in the memory unit 26 may also be correction coefficients for the gamma voltage characteristics corresponding to the range of about 12.0%~30.0%.

The gamma correction control unit 24 generates the selection control signal CS so as to be relevant to the ratio information DUS received from the data processing unit 30, and supplies the selection control signal CS to the memory unit 26. According to this, the memory unit 26 selects one of pieces of gamma correction information G-Data relevant to the selection control signal CS, and supplies the gamma correction information G-Data to the gamma correction unit 28 along with this, the gamma correction control unit 24 generates and supplies the gamma correction enable signal G-CS to the gamma correction unit 28 at the time the selection control signal CS is supplied to the memory unit 26.

The gamma correction unit 28 corrects the gamma voltage of the image display panel of the image display device by using the gamma correction information G-Data supplied from the memory unit 26 in response to the gamma correction enable signal G-CS from the gamma correction control unit 24. In detail, the gamma correction unit 28 also uses the gamma programming correction method, when the gamma correction unit 28 makes programming of a gamma-IC of the image display device according to coefficients included to the gamma correction information G-Data by using a programmable interface circuit provided therein.

In the meantime, the image display device having the display panel 2 provided therein may be a liquid crystal display device, a field emission display device, a plasma display panel, or a light emitting display device.

Referring to FIG. 2, if the liquid crystal display device is used as the image display device of the present invention, the liquid crystal display device includes a liquid crystal display panel 2 having a plurality of pixel regions, a data driver 4 for driving a plurality of data lines DL1~DLm, a gate driver 6 for driving a plurality of gate lines GL1~GLn, a timing controller 8 for arranging the image data R, G, B received from an outside of the liquid crystal display device suitable for driving the liquid crystal display panel 2 and supplying the image data R, G, B to the data driver 4, generating gate and date control signals GCS and DCS, and controlling the gate driver 6 and the data driver 4, and a gamma reference voltage generating unit 10 for generating a positive or negative polarity gamma reference voltage VGamma and supplying the gamma reference voltage VGamma to the data driver 4.

The timing controller 8 arranges the image data R, G, B received from an outside of the liquid crystal display device suitable for driving the liquid crystal display panel and supplies the image data R, G, B to the data driver 4, and generates gate and data control signals GCS, and DCS by using synchronizing signals DCLK, Hsync, Vsync, DE received from an outside system, and supplies the gate and data control signals GCS, and DCS supplied thus to the gate and data drivers 6 and 4 respectively.

The liquid crystal display panel 2 has thin film transistors FTF formed at pixel regions defined by a plurality of gate lines GL1~GLn and a plurality of data lines DL1~DLm, and liquid crystal capacitors Clc connected to the thin film transistors TFT respectively. The liquid crystal capacitor Clc has a pixel electrode connected to the thin film transistor TFT, and a common electrode facing the pixel electrode with the liquid crystals disposed therebetween. The thin film transistor TFT supplies the image signal from the data lines DL1~DLm to the pixel electrode in response to a scan pulse from the gate lines GL1~GLn. The liquid crystal capacitor Clc has a voltage charged therein, which is a difference between the image signal supplied to the pixel electrode and a reference common voltage supplied to the common electrode, and varies an orientation of liquid crystal molecules with the difference of the voltage to control a light transitivity for producing the gray scale. The liquid crystal capacitor Clc has a storage capacitor Cst connected thereto in parallel for making the image signal charged therein to be sustained until the next image signal is supplied. The storage capacitor Cst is formed as the pixel electrode overlaps with a prior gate line with an insulation film disposed therebetween or as the pixel electrode overlaps with a storage line with the insulation film disposed therebetween.

The data driver 4 converts the image data from the timing controller 8 into an analog voltage, i.e., an image signal by using a data control signals DCS, for an example, a source start pulse SSP, a source shift clock SSC, source output enable signal SOE and so on. In detail, the data driver 4 latches the image data received through the timing controller 8 in response to the source shift clock SSC, and supplies a image signal of one horizontal line portion to the data lines DL1~DLm in every one horizontal period in which the scan pulse is supplied to the gate lines GL1~GLn in response to the source enable SOE signal. In this instance, the data driver 4 selects a positive or negative polarity gamma voltage of a predetermined level according to a gray scale of the image data arranged thus, and supplies the gamma voltage selected thus to the data lines DL1~DLm as the image signal.

The gate driver 6 generates scan pulses in succession in response to gate control signals GCS from the timing controller 8, for an example, a gate start pulse GSP, a gate shift clock GSC, and a gate output enable signal GOE, and supplies the scan pulses to the gate lines GL1~GLn in succession. In detail, the gate driver 6 shifts the gate start pulse GSP from the timing controller 8 according to the gate shift clock GSC, and supplies the scan pulses, for an example, gate on voltages to the gate lines GL1~GLn succession. In the meantime, in a period when no gate on voltage is supplied to the gate lines GL1~GLn, the gate driver 6 supplies gate off voltages. In this instance, the gate driver 6 controls a pulse width of the scan pulse in response to the GOE signal.

The gamma reference voltage generating unit 10 has a gamma-IC for converting a voltage applied from an outside of the liquid crystal display device into the positive polarity or negative polarity reference voltage VGamma and supplies the positive polarity or negative polarity reference voltage VGamma to a gamma gray scale voltage generating unit of the data driver. In this instance, the gamma reference voltage generating unit 10 supplies the reference gamma voltages VGamma having a gamma corrected programmed by the gamma correction unit 28 of the gamma correction device 20 to the gamma gray scale voltage generating unit.

Figure 6:
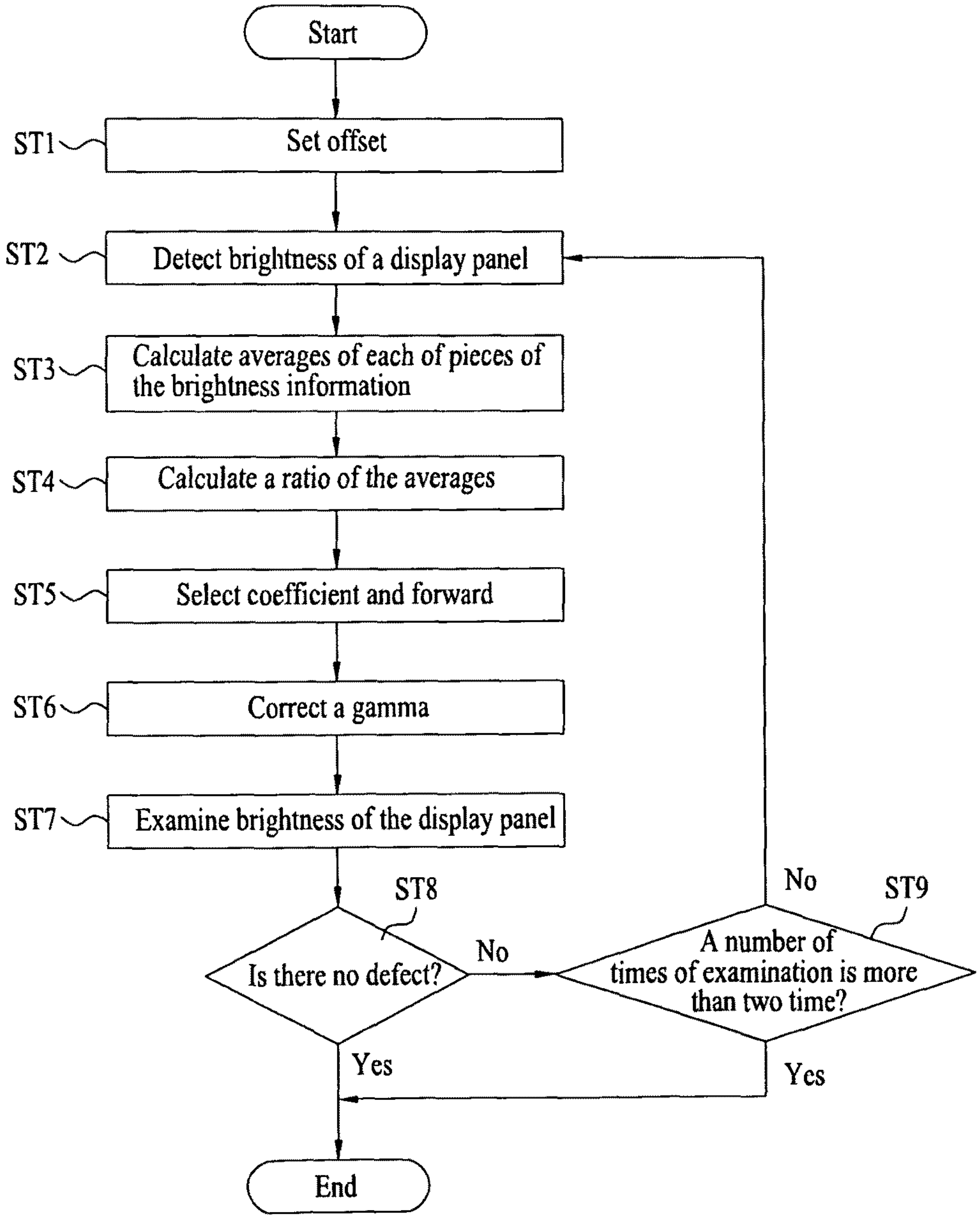
FIG. 6 illustrates a flow chart showing the steps of a method for correcting a gamma in accordance with a preferred embodiment of the present invention.

FIG. 6 illustrates a flow chart showing the steps of a method for correcting a gamma in accordance with a preferred embodiment of the present invention.

Referring to FIG. 6, in the offset setting step ST1, a gamma correction control signal SCS is received and a plurality of pieces of offset information included to the gamma correction control signal SCS are analyzed. Then, driving offsets of a gamma correction device 20 are set to supply control information CC to a gamma control unit 24 in succession in view of time.

Then, in the brightness measuring step ST2 of the display panel 2, a brightness detection unit 32 detects brightness information YDS on images displayed on the display panel of the image display device in response to a detection control signal PCS from the gamma correction control unit 24, repeatedly. In this instance, the brightness detection unit 32 detects the brightness information YDS on images displayed at least two gray scale levels from the display panel 2 alternately and repetitively and supplies the brightness information YDS detected thus to a data processing unit 30.

In the step ST3 for calculating averages of each of the brightness information, the data processing unit 30 receives the brightness information YDS for each of gray scale levels detected alternately and repetitively from the brightness detection unit 32, and combines the brightness information YDS for each of gray scale levels to calculate averages of the brightness for each of gray scale levels. That is, the data processing unit 30 can receive the brightness information YDS on the image of 0 gray scale level and the brightness information YDS on the image of 127 gray scale level from the brightness detection unit 32 for 5 times, alternately. In this case, the data processing unit 30 combines, and calculates an average of, the brightness information YDS on the image of 0 gray scale level supplied thereto for 5 times. The data processing unit 30 combines, and calculates an average of, the brightness information YDS on the image of 127 gray scale level supplied thereto for 5 times. In this instance, in order to correct and minimize detection errors of the brightness information YDS of the brightness detection unit 32, the data processing unit 30 may discard the brightness information YDS detected at first and the brightness information YDS detected at last and combines, and calculates averages of, the pieces of the brightness information YDS detected at second to fourth times.

In the average ratio calculating step ST4, the data processing unit 30 calculates a ratio of the average of the brightness of the image of one gray scale level to the average of the brightness of the image of the other gray scale levels. That is, in the average ratio calculating step ST4, the data processing unit 30 calculates a ratio of the average of the brightness of the image of 0 gray scale level to the average of the brightness of the image of 127 gray scale levels. The ratio of the average of the brightness calculated thus is supplied to the gamma correction control unit 24 as ratio information DUS.

In the coefficient selection and forwarding step ST5, the data processing unit 30 generates a selection control signal CS so as to be relevant to the ratio information DUS and supplies the selection control signal CS to the memory unit 26. Then, the memory unit 26 selects one of pieces of the gamma correction information G-Data relevant to the selection control signal CS and supplies the gamma correction information G-Data selected thus to the gamma correction unit 28. Along with this, when the selection signal CS is supplied to the memory unit 26, the gamma correction control unit 24 generates and supplies a gamma correction enable signal G-CS to the gamma correction unit 28.

In the gamma correction step ST6, the gamma correction unit 28 corrects a gamma voltage of the image display device, for an example, the gamma reference voltage VGamma, by using gamma correction information G-Data received from the memory 26 in response to the gamma correction enable signal G-CS from the gamma correction control unit 24. In detail, the gamma correction unit 28 uses a gamma programming method, when the gamma correction unit 28 uses a programmable interface circuit provided therein for programming a gamma-IC in the image display device according to the gamma correction information G-Data.

In the display panel brightness examination step ST7, the brightness information YDS is detected from the images of at least two gray scale levels on the display panel 2 of the image display device having the gamma thereof corrected thus alternately and repetitively for at least one or more than one time, for an example, 3 times, and the brightness information YDS detected thus is compared to pieces of preset reference brightness information to determine a result of examination.

In the examination determining step ST8, if there is no problem in the result of examination, the display panel 2 is determined acceptable, and the examination is finished. If the brightness information YDS detected in the examination step is determined to be defective as the brightness information YDS detected thus fails to satisfy the reference brightness information, after performing the display panel brightness measuring step ST2, the gamma correction step ST6 and the display panel brightness examination step ST7 are performed. However, if a number of re-examination times in the re-examination determining step ST9 is two or more than two times, no gamma correction step is performed, but the display panel 2 is determined defective right away, and the examination is finished.

As has been described, the system and method for correcting a gamma of the present invention detects pieces of brightness information YDS from images of at least two gray scale levels on the display panels 2 alternately and repetitively, averages a result of the detection, and calculates gamma correction coefficients according to a ratio of comparison of the averages. Since the gamma voltage for the image display device is corrected by using the gamma correction coefficients corrected thus, the system and method for correcting a gamma of the present invention can improve gamma correction efficiency and reliability while a gamma correction time period can be made shorter, and can simplify the gamma correction device to reduce a production cost of the image display devices.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A gamma correction system comprising:

a brightness detection unit for alternately and repetitively detecting brightness information from at least two images displayed with a low gray scale level and a middle gray scale level on a display panel of an image display device in response to a gamma correction control signal programmed by a user; and a gamma correction device for averaging brightness information detected alternately and repetitively in response to the gamma correction control signal respectively, and selecting gamma correction information according to a ratio of the averages using a memory for correcting a gamma voltage of the image display device, wherein the brightness detection unit for detecting brightness information from at least two images displayed with the low gray scale level and the middle gray scale level alternately and repetitively includes a single optical instrument having single photo-sensor, wherein the gamma correction device includes a memory unit for storing a plurality of pieces of gamma correction information and forwarding the gamma correction information relevant to a selection control signal upon reception of the selection control signal;

a data processing unit for receiving the brightness information on images for each of the low gray scale level and the middle gray scale level from the brightness detection unit in succession and calculating averages of the pieces of brightness information for each of the low gray scale level and the middle gray scale level and ratios thereof;

a gamma correction control unit connected to an output of the data processing unit for generating the selection control signal relevant to the ratio information and forwarding the selection control signal to the memory unit, generating and forwarding a gamma correction enable signal in response to the selection control signal; and a gamma correction unit for receiving the gamma correction information from the memory unit upon reception of the gamma correction enable signal from the gamma correction control unit, and correcting the gamma voltage of the image display device by using the gamma correction information, wherein the brightness information detected is compared to pieces of preset reference brightness information to determine a result of examination, if there is no problem in the result of examination, the display panel is determined acceptable, if the brightness information detected fails to satisfy the reference brightness information two or more times, no gamma correction step is performed, and the display panel is determined defective right away, wherein the data processing unit discards the brightness information detected at first and the brightness information detected at last and combines, and calculates averages of, the pieces of the brightness information detected at between the first and the last times, wherein averages of the brightness information detected at between the first and the last times are calculated thus respectively, the data processing unit calculates the ratio information a ratio of a brightness average of an image of the low gray scale level to the brightness averages of images of the middle gray scale level.

2. The gamma correction system of claim 1, wherein the gamma correction control signal includes a plurality of offset information for controlling the image display device, the brightness detection unit and the gamma correction unit, wherein the offset information includes gray scale information for setting levels of the gray scale of the at least two images on the images, and a number of detection times of the brightness information by the brightness detection unit.

3. The gamma correction system of claim 1, wherein the gamma correction unit programs a gamma-IC in the image display device according to coefficients included to the gamma correction information by using a programmable interface circuit provided therein.

4. A method for correcting a gamma comprising the steps of:

alternately and repetitively detecting brightness information from at least two images displayed with a low gray scale level and a middle gray scale on a display panel of an image display device in response to a gamma correction control signal programmed by a user; and averaging at a data processor brightness information detected alternately and repetitively in response to the gamma correction control signal respectively, and selecting gamma correction information according to a ratio of the averages using a memory unit for correcting a gamma voltage of the image display device, wherein the step of detecting brightness information includes the step of detecting the brightness information from at least two images displayed with the low gray scale level and the middle gray scale level at least one time alternately and repetitively by using a brightness detection unit having single photo-sensor, wherein correcting a gamma voltage includes the steps of storing a plurality of gamma correction signals, and forwarding the gamma correction signal relevant to a selection control signal upon reception of the selection control signal from a gamma correction control unit;

receiving pieces of brightness information on images for each of gray scale levels in succession and calculating at the data processor averages of the pieces of brightness information at a data processing unit on images for each of the low gray level and the middle gray scale level and ratio information of the averages;

generating the selection control signal relevant to the ratio information received by the gamma correction control unit from the data processing unit, supplying the selection information to a memory unit, generating a gamma correction enable signal when the selection control signal is received and forwarding the gamma correction enable signal;

receiving the gamma correction information from the memory unit in response to the gamma correction enable signal, and correcting the gamma voltage of the image display device using the gamma correction information received; and detecting the brightness information of the image display device having a gamma thereof corrected thus again, for re-examining defect of the display panel at least one or more than one time, wherein the brightness information detected is compared to pieces of preset reference brightness information to determine a result of examination, if there is no problem in the result of examination, the display panel is determined acceptable, if the brightness information detected fails to satisfy the reference brightness information two or more times, no gamma correction step is performed, and the display panel is determined defective right away;

wherein the calculating averages of the pieces of brightness information discards the brightness information detected at first and the brightness information detected at last and combines, and calculates averages of, the pieces of the brightness information detected at between the first and the last times, wherein the calculating averages of the pieces of brightness information are averages of the brightness information detected at between the first and the last times are calculated thus respectively, calculates the ratio information of a brightness average of an image of the low gray scale level to the brightness averages of images of the middle gray scale level.

5. The method of claim 4, wherein the gamma correction control signal includes a plurality of offset information for controlling the image display device, the brightness detection unit and the gamma correction unit, wherein the offset information includes gray scale information for setting levels of the gray scale of the at least two images on the images, and a number of detection times of the brightness information by the brightness detection unit.

6. The method of claim 4, wherein the step of detecting brightness information includes the step of detecting the brightness information on the images displayed with at least two gray scale levels at least one time alternately and repetitively by using a brightness detection unit having a single photo-sensor.

7. The method as claimed in claim 4, wherein the step of correcting a gamma voltage includes the step of;

programming a gamma-IC in the image display device according to coefficients included to the gamma correction information by using a programmable interface circuit.

* * * * *